(12) United States Patent
Tsirkin

(10) Patent No.: US 11,977,493 B2
(45) Date of Patent: May 7, 2024

(54) SAFE VIRTUAL MACHINE PHYSICAL DEVICE ACCESS FOR NETWORK FUNCTION VIRTUALIZATION

(71) Applicant: Red Hat, Inc., Raleigh, NC (US)

(72) Inventor: Michael Tsirkin, Westford, MA (US)

(73) Assignee: RED HAT, INC., Raleigh, NC (US)

( * ) Notice: Subject to any disclaimer, the term of this patent is extended or adjusted under 35 U.S.C. 154(b) by 0 days.

(21) Appl. No.: 16/514,477

(22) Filed: Jul. 17, 2019

(65) Prior Publication Data

US 2021/0019267 A1 Jan. 21, 2021

(51) Int. Cl.
*G06F 12/14* (2006.01)
*G06F 9/455* (2018.01)
*G06F 12/10* (2016.01)
*G06F 13/16* (2006.01)
*G06F 13/28* (2006.01)

(52) U.S. Cl.
CPC ...... *G06F 12/1441* (2013.01); *G06F 9/45558* (2013.01); *G06F 12/10* (2013.01); *G06F 13/1668* (2013.01); *G06F 13/28* (2013.01); *G06F 2009/45579* (2013.01); *G06F 2009/45587* (2013.01); *G06F 2009/45595* (2013.01); *G06F 2212/1052* (2013.01)

(58) Field of Classification Search
CPC .. G06F 12/1441; G06F 9/45558; G06F 12/10; G06F 13/1668; G06F 13/28; G06F 2009/45579; G06F 2009/45587; G06F 2009/45595; G06F 2212/1052
USPC ........................................................ 711/163
See application file for complete search history.

(56) References Cited

U.S. PATENT DOCUMENTS

| 9,021,476 | B1 | 4/2015 | Pratt |
| 9,407,612 | B2 | 8/2016 | Sood et al. |
| 9,864,859 | B2 | 1/2018 | Sood et al. |
| 10,013,199 | B2 | 7/2018 | Tsirkin et al. |
| 10,055,136 | B2 | 8/2018 | Tsirkin et al. |
| 10,140,139 | B1* | 11/2018 | Pratt .................. G06F 21/62 |
| 2008/0133709 | A1* | 6/2008 | Aloni ............... G06F 9/45537 709/218 |
| 2011/0321158 | A1* | 12/2011 | Craddock ............ G06F 9/468 726/20 |

(Continued)

OTHER PUBLICATIONS

Vmware, Inc.; "Acceleration Using SR-IOV"; VMware vCloud NFV OpenStack Edition 3.0; Aug. 7, 2018; (2 Pages).

(Continued)

*Primary Examiner* — Gautam Sain

(57) ABSTRACT

A system includes a host with a memory, a processor, a supervisor, and a device with access to DMAs. The system also includes a guest with access to GMAs and configured to initialize a first driver for the device. The supervisor is configured to map GMAs to a first subset of DMAs, map SMAs to a second subset of DMAs, which are located in a reserved range of addresses, and to initialize a second driver for the device with access to the SMAs. The device is configured to communicate with the guest and the supervisor via the first subset of DMAs and the SMAs respectively. The supervisor is configured to intercept a request from the first driver and validate that memory addresses associated with the request are outside of the reserved range. The supervisor is also configured to send the request to the device via the second driver.

19 Claims, 5 Drawing Sheets

(56) References Cited

U.S. PATENT DOCUMENTS

2016/0350244 A1* 12/2016 Tsirkin .................. G06F 3/0664
2017/0031593 A1*  2/2017 Tsirkin .................. G06F 3/0631
2017/0123996 A1*  5/2017 Kishan ................ G06F 9/45558
2017/0249106 A1*  8/2017 Apfelbaum ......... G06F 12/1433
2017/0329618 A1* 11/2017 Tsirkin ............... G06F 12/1475
2018/0060245 A1*  3/2018 Tsirkin ............... G06F 9/45558
2018/0136868 A1*  5/2018 Tsirkin ............... G06F 9/45558
2019/0228145 A1*  7/2019 Shanbhogue ......... G06F 3/0659
2020/0192601 A1*  6/2020 Okada .................. G06F 3/0659

OTHER PUBLICATIONS

Vmware, Inc.; "Understanding Memory Resource Management in VMware® ESX™ Server"; Source: Technical Marketing, SD; Revision: Aug. 20, 2009; (20 Pages).

* cited by examiner

SAFE VIRTUAL MACHINE PHYSICAL DEVICE ACCESS FOR NETWORK FUNCTION VIRTUALIZATION

BACKGROUND

Computer systems may run applications and processes used in Network Function Virtualization ("NFV") that may communicate and provide connectivity to other devices, such as hardware devices. For example, virtual machines, applications and processes may share memory with physical devices. In computer systems, shared memory may refer to memory that can be accessed simultaneously by different resources, such as computer hardware or software. Such availability allows a single copy of data to service multiple resources, instead of providing a separate copy of the data for each specific resource. The computer system may allow direct device access from virtual machines and applications in order to avoid the overhead of communicating with a supervisor and/or operating system (OS).

SUMMARY

The present disclosure provides new and innovative systems and methods of safe virtual machine physical device access for network function virtualization. In an example, a system includes a host with a memory, a processor, a supervisor, and a device with access to a plurality of device memory addresses ("DMAs"). The system also includes a guest with access to a plurality of guest memory addresses ("GMAs"). The guest is configured to execute on the processor to initialize a first driver for the device. The supervisor is configured to execute on the processor to map a first subset of GMAs to a first subset of DMAs. The device is configured to communicate with the guest via the first subset of DMAs. Additionally, the supervisor is configured to map a plurality of supervisor memory addresses ("SMAs") to a second subset of DMAs. The second subset of DMAs is located in a reserved range of addresses. The supervisor is also configured to initialize a second driver for the device with access to the plurality of SMAs. The device is configured to communicate with the supervisor via the plurality of SMAs. The supervisor is also configured to intercept a request from the first driver to the device and validate that all memory addresses associated with the request are outside of the reserved range of addresses. After validating the request, the supervisor is configured to send the request to the device via the second driver.

In an example, a method includes mapping a first subset of guest memory addresses (GMAs) to a first subset of device memory addresses (DMAs). A device is configured to communicate with a guest via the first subset of DMAs. The method also includes mapping a plurality of supervisor memory addresses (SMAs) to a second subset of DMAs, where the second subset of DMAs is located in a reserved range of addresses. Additionally, the method includes initializing a first driver for the device with access to the plurality of SMAs, where the device is initialized with a second driver and the device is configured to communicate with a supervisor via the plurality of SMAs. The method also includes intercepting a request from the second driver to the device and validating that all memory addresses associated with the request are outside of the reserved range of addresses. After validating the request, the method includes sending the request to the device via the first driver.

In an example, a non-transitory machine-readable medium stores code, which when executed by a processor, is configured to map a first subset of guest memory addresses (GMAs) to a first subset of device memory addresses (DMAs). A device is configured to communicate with a guest via the first subset of DMAs. The non-transitory machine-readable medium is also configured to map a plurality of supervisor memory addresses (SMAs) to a second subset of DMAs, where the second subset of DMAs is located in a reserved range of addresses. Additionally, the non-transitory machine-readable medium is configured to initialize a first driver for the device with access to the plurality of SMAs, where the device is initialized with a second driver and the device is configured to communicate with a supervisor via the plurality of SMAs. The non-transitory machine-readable medium is also configured to intercept a request from the second driver to the device and validate that all memory addresses associated with the request are outside of the reserved range of addresses. After validating the request, the non-transitory machine-readable medium is configured to send the request to the device via the first driver.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
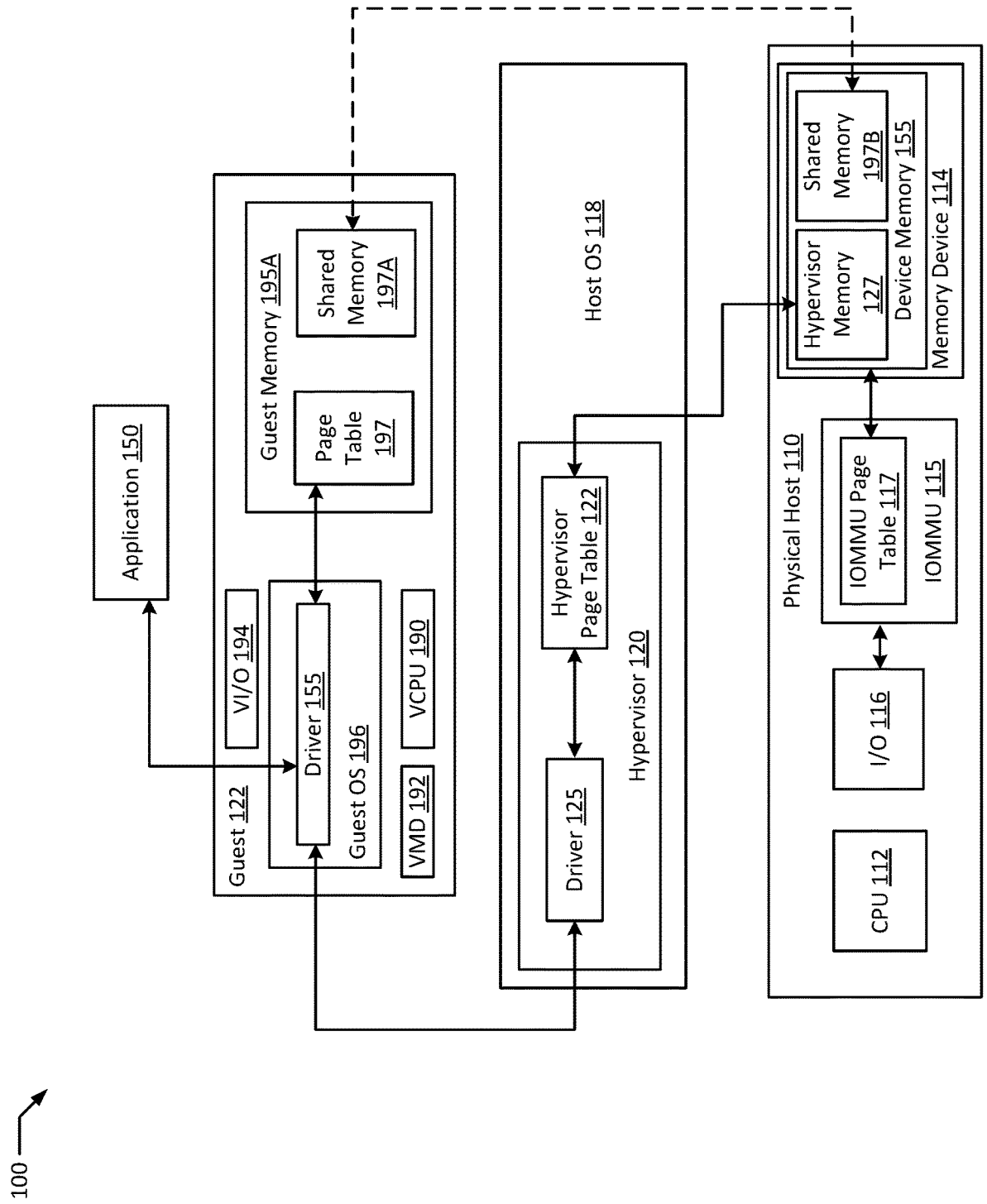
FIG. 1 illustrates a block diagram of an example computer system according to an example embodiment of the present disclosure.

Techniques are disclosed for providing safe virtual machine physical device access for network function virtualization. Current techniques of improving system performance involve direct device access from the virtual machine, which allows significant performance gains by avoiding data copy and translation overheads. Unfortunately, device access from the virtual machine also creates security risks. For example, allowing the virtual machine to directly access a device may enable the virtual machine and its associated applications to damage the device. A virtual machine and its associated applications may delete or alter data that the device uses for internal purposes, either intentionally and maliciously, or inadvertently, thereby corrupting and/or breaking the device.

Typically, an input output memory management unit ("IOMMU") is present to protect the operating system (OS), hypervisor and other virtual machines from guest driver bugs and security issues. However, the IOMMU does not protect the device, therefore, virtual machine and/or guest failures may lead to physical device breakage, which may be temporary or permanent. For example, virtual machines with access to the supervisor memory may overwrite device specific memory (e.g., supervisor memory for internal device functions). This may be intentional due to malware, or the application may overwrite supervisor memory unintentionally. A physical device may break due to virtual machine and/or guest failures resulting from a situation in which a program, such as a virtual machine application, stops performing its expected functions and/or maliciously alters device memory. In some cases, devices may be designed with hardware that has enhanced security features. However, designing security features into hardware is expensive and may be OS dependent.

As discussed in the various example embodiments disclosed herein, to increase security, during initialization, a supervisor (e.g., hypervisor) programs an IOMMU device and maps host physical memory of a virtual machine at addresses corresponding to guest physical addresses. A device is allowed access to the guest physical addresses. Additionally, a supervisor driver (e.g., hypervisor driver) for the device allocates some of the supervisor memory and the supervisor reserves a range of guest physical addresses for the supervisor memory. Then, the supervisor maps the supervisor memory at the range of guest physical addresses in the IOMMU and the device is allowed access to the range of guest physical addresses.

The guest physical addresses are protected in CPU page table entries such that the virtual machine or guest of the virtual machine cannot modify the guest physical addresses. In some instances, the virtual machine or guest of the virtual machine may be restricted from reading the guest physical addresses. The supervisor then configures the device to use the reserved memory for internal purposes (e.g., to store device information such as a MAC address) and for communication with the driver. To use the device, the supervisor driver receives a request from a guest of the virtual machine. The request may include one or more guest physical addresses and lengths (e.g., virtual addresses "2800", "5600") and lengths (e.g., 4 kilobyte (kb), 1 kb). The supervisor validates the addresses and lengths to verify that the address and length does not overlap the reserved range. Specifically, the supervisor or supervisor driver verifies that requests to use the device do not include addresses within the reserved range, thereby advantageously protecting the reserved range of supervisor memory. For example, by preventing the virtual machine or guest from accessing the reserved range of addresses, the virtual machine or guest is advantageously prevented from corrupting the reserved memory and breaking the device.

After validation, the driver submits the request to the device so that the device can perform its requested function without risk of breaking. The address range check consumes very little resources as it is faster than software address translation and provides additional security to the system. Hardware may be enhanced with security features, however, these hardware features are often expensive and my be OS dependent. Additionally, the use of bifurcated drivers are note safe against malicious userspace applications and guests. Thus, the present disclosure provides a more computationally effective solution to the above-discussed problems because software can be used in systems that implement the supervisor and supervisor driver to protect physical devices. For example, by improving security and reducing the risk of malicious attempts to access devices through the supervisor, hardware devices can be used without the need of added hardware security features. Furthermore, the improved performance allows for running more virtual machines on the same hardware, which is especially useful for network function virtualization, which typically relies on lower-security solutions such as pass-through with virtual machine trusted drivers.

In a specific example, a guest may want a device to write to guest physical addresses and the request may be passed to the device. In some scenarios, the guest may take a supervisor or hypervisor address and give that address to the device. For example, the guest may provide an address associated with a mac address to the device and incoming packets may then overwrite the stored mac address. If the mac address is overwritten, the device may start using the wrong mac address by corrupting its own memory.

FIG. 1 depicts a high-level component diagram of an example computer system 100 in accordance with one or more aspects of the present disclosure. The computer system 100 may include a physical host 110, which may include a processor (e.g., CPU 112), a memory device 114, an IOMMU 115, and an input/output device (e.g., I/O 116). The IOMMU 115 may store an IOMMU page table 117. Additionally, the memory device 114 may include device memory 115 that has a portion of hypervisor memory 127 and shared memory 197B.

The computer system 100 may also include a host operating system ("OS") 118, which may include a supervisor (e.g., hypervisor 120). The supervisor (e.g., hypervisor 120) may be a program. The supervisor may be the hypervisor 120 or the host OS 118. For example, the supervisor (e.g., hypervisor 120) may be a program that constitutes the core of the host OS 118. As used herein, the supervisor (e.g., hypervisor 120) may refer to a privileged software component of the host OS 118. For example, the supervisor (e.g., hypervisor 120) may have the ability to change memory mappings for an application (e.g., Application 150). Additionally, the supervisor (e.g., hypervisor 120) may act as a controller of multiple processes including individual user processes within an application memory space. For example, the supervisor (e.g., hypervisor 120) may perform several tasks such as executing processes and handling interrupts. An application (e.g., Application 150) may be an application in a virtual machine, or an application located elsewhere. As used herein, an application (e.g., Application 150) may refer to less privileged software without the ability to change memory mappings for itself. The supervisor (e.g., hypervisor 120) may provide basic services for the host OS 118 that are requested by other parts of the host OS 118 or by application programs. For example, the supervisor (e.g., hypervisor 120) may provide basic services such as memory management, process management, file management, and I/O management. In an example, the supervisor (e.g., hypervisor 120) may be part of a kernel.

In various example embodiments, the supervisor 120 may include a supervisor driver 125 and supervisor memory (e.g., hypervisor memory 127). In an example, the supervisor driver 125 may be a program that allows the host OS 118 and/or supervisor 120 to interact with hardware devices or memory devices. The supervisor driver 125 may also be configured to allocate supervisor memory and reserve a range of addresses for the supervisor memory. Additionally, the supervisor driver 125 may be configured to initialize a connection between guest driver 155 and a device (e.g., I/O device 116). The supervisor driver 125 may also prevent access to the reserved range from virtual machines or guests, which advantageously increases security and prevents virtual machines or guests from modifying the reserved memory, which advantageously prevents device failure. For example, some physical memory pages may not be writable by a virtual machine or guest, which may increase security of the system and may prevent the virtual machine from crashing the userspace and/or breaking the device.

The physical host 110 may include other devices, such as a hardware device, a network device (e.g., a network adapter or any other component that connects a computer to a computer network), a peripheral component interconnect (PCI) device, storage devices, disk drives, sound or video adaptors, photo/video cameras, printer devices, keyboards, displays, etc.

The computing system 100 may also include a guest 122, which may include a guest OS 196, guest memory 195A, one or more virtual I/O devices 194, one or more virtual memory devices (e.g., VMD 192), and one or more virtual processors (e.g., VCPU 190). The guest OS 196 may include a driver 155 that communicates with applications (e.g., Application 150) and the supervisor driver 125. The guest memory 195A may include a page table 197A and a portion of shared memory 197A.

As used herein, physical processor or processor (e.g., CPU 112) refers to a device capable of executing instructions encoding arithmetic, logical, and/or I/O operations. In one illustrative example, a processor may follow a Von Neumann architectural model and may include an arithmetic logic unit ("ALU"), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit ("CPU").

As discussed herein, a memory device 114 refers to a volatile or non-volatile memory device, such as random access memory ("RAM"), read-only memory ("ROM"), electrically erasable read only memory ("EEPROM"), or any other device capable of storing data. As discussed herein, I/O device 116 refers to a device capable of providing an interface between one or more processor pins and an external device capable of inputting and/or outputting binary data.

Processors (e.g., CPU 112) may be interconnected using a variety of techniques, ranging from a point-to-point processor interconnect, to a system area network, such as an Ethernet-based network.

Figure 2:
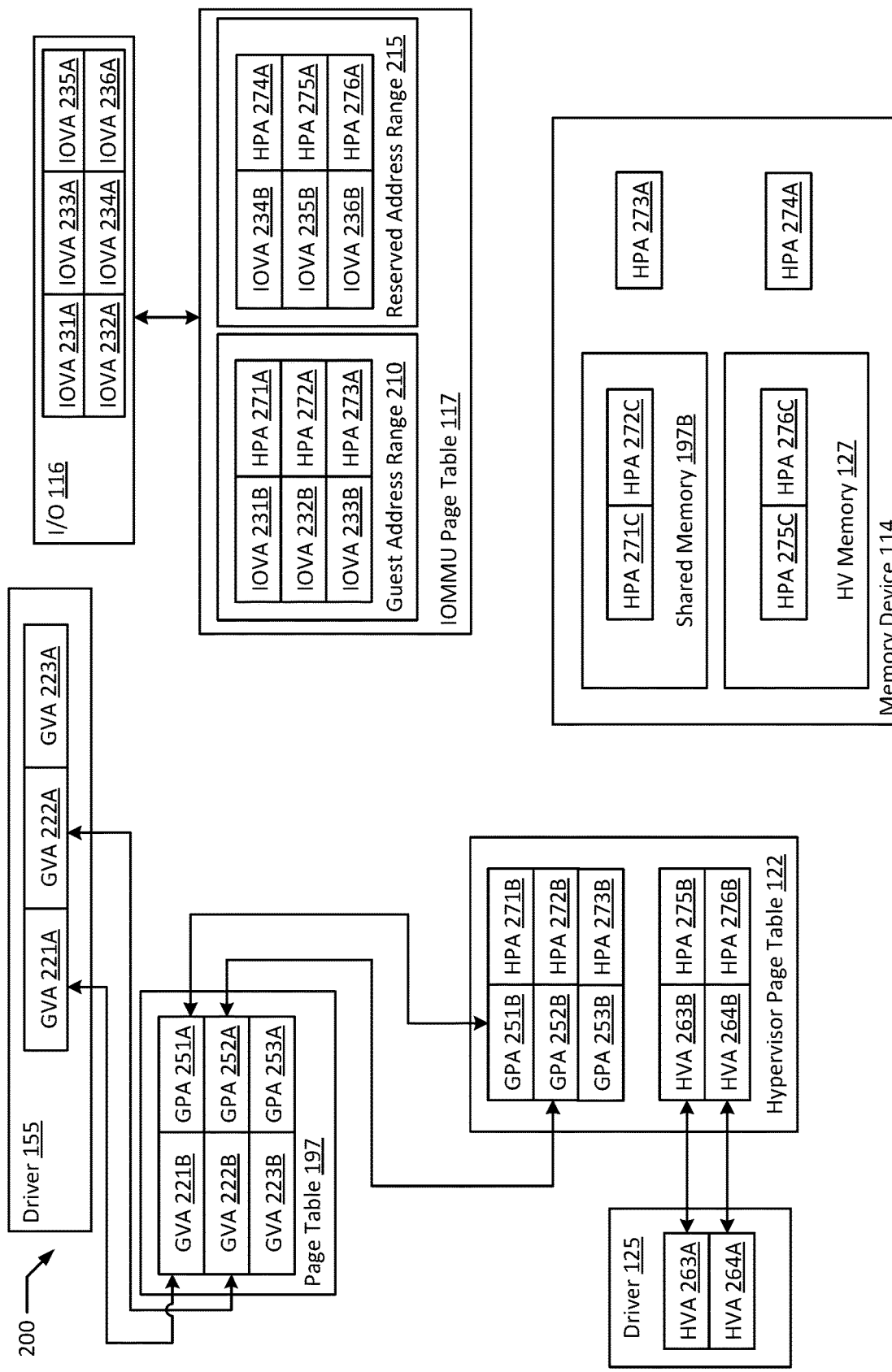
FIG. 2 illustrates a block diagram of various memories, memory addresses and memory mappings according to an example embodiment of the present disclosure.

FIG. 2 illustrates the various memories, memory addresses and memory mappings of the I/O device 116, guest 122, physical host 110 and host OS 118. The physical host 110 includes I/O device 116 and IOMMU 115 along with memory device 114. The memory device may include one ore more memory pages that include HPAs 271-276 divided amount shared memory 197B and hypervisor memory 127. In the illustrated example, the shared memory 197B includes HPAs 271-272 and the HV memory 127 includes HPAs 275-276. The device (e.g., I/O device 116 and associated virtual I/O device 194) may have access to a plurality of device memory addresses (e.g., IOVA 231-236). Each of the device memory addresses may be mapped to hypervisor physical addresses in an IOMMU page table 117. For example, the IOMMU page table 117 may include a guest address range 210 with IOVA 231-233 mapped to HPA 271-273. As illustrated in FIG. 2, IOVA 231A corresponds to IOVA 231B, IOVA 232A corresponds to IOVA 233B, and so forth in the IOMMU page table 117. Specifically, the device memory address 231 (e.g., IOVA 231A of the I/O device 116 is illustrated as IOVA 231B within the IOMMU page table mapping). As mentioned above, during initialization, the supervisor (e.g., hypervisor 120) may program the IOMMU 115 and map host physical memory (e.g., HPAs 271-273) at addresses corresponding to guest physical addresses (e.g., GPAs 251-253), which are mapped to GVAs 221-223 in page table 197 and IOVA 231-233 in guest address range 210 of IOMMU page table 117.

Additionally, the IOMMU page table 117 may include a reserved address range 215 that maps IOVA 234-236 to HPA 274-276. For example, the reserved address range 215 includes a mapping of device memory addresses (e.g., IOVA 234-236) to HPA 274-276 in the IOMMU page table 117. As mentioned above, the supervisor driver 125 may allocate some hypervisor memory 127 and the supervisor (e.g., hypervisor 120) may reserve a range of guest physical addresses for the hypervisor memory 127. The supervisor (e.g., hypervisor 120) may map the hypervisor memory 127 in the IOMMU 115 in the reserved address range 215 of the IOMMU page table 117. The reserved address range 215 is protected such that the virtual machine or guest 122 is restricted from modifying the addresses.

The guest 122 may also have access to a plurality of guest memory addresses (e.g., GVAs 221-223 mapped to GPAs 251-253). For example, the guest memory 195A may include guest virtual addresses and guest physical addresses that are mapped in a page table 197. For example, the page table 197 may include a mapping of GVAs 221-223 to GPAs 251-253. The GVAs 221A-223A correspond to GVAs 221B-223B illustrated in page table 197. The supervisor (e.g., hypervisor 120) may map a first subset of GMAs (e.g., GVAs 221-223 and GPAs 251-253 to a first subset of DMAs (e.g., IOVA 231-233). For example, the hypervisor page table 122 may include a mapping of GPAs 251-253 to HPAs 271-273. Similarly, the IOMMU page table 117 shows the mapping of HPA 271-273 to device memory IOVA 231-233. Additionally, the supervisor (e.g., hypervisor 120) may map a plurality of supervisor memory addresses (e.g., HVAs 263-264) to a second subset of DMAs (e.g., IOVA 235-236), which is indicated by the mapping of HVAs 263-264 to HPAs 275-276 in hypervisor page table 122 and the mapping of IOVA 235-236 to HPAs 275-276 in the reserved address range 215 of IOMMU page table 117.

The supervisor or hypervisor 120 may initialize the supervisor driver 125 that has access to the plurality of supervisor memory addresses (e.g., HVAs 263-264), which are mapped to the HPAs 275-276 of the reserved address range 215.

A virtual machine or guest 122 may request to use a device (e.g., I/O device 116). In an example, a request may include a virtual address and a length. The supervisor 120 may validate whether the request does not overlap the reserved address range 215. Requests that overlap the reserved address range 215 may be denied by supervisor 120. Additionally, requests that do not overlap the reserved address range 215 may be submitted to the device (e.g., I/O device 116).

Figure 3:
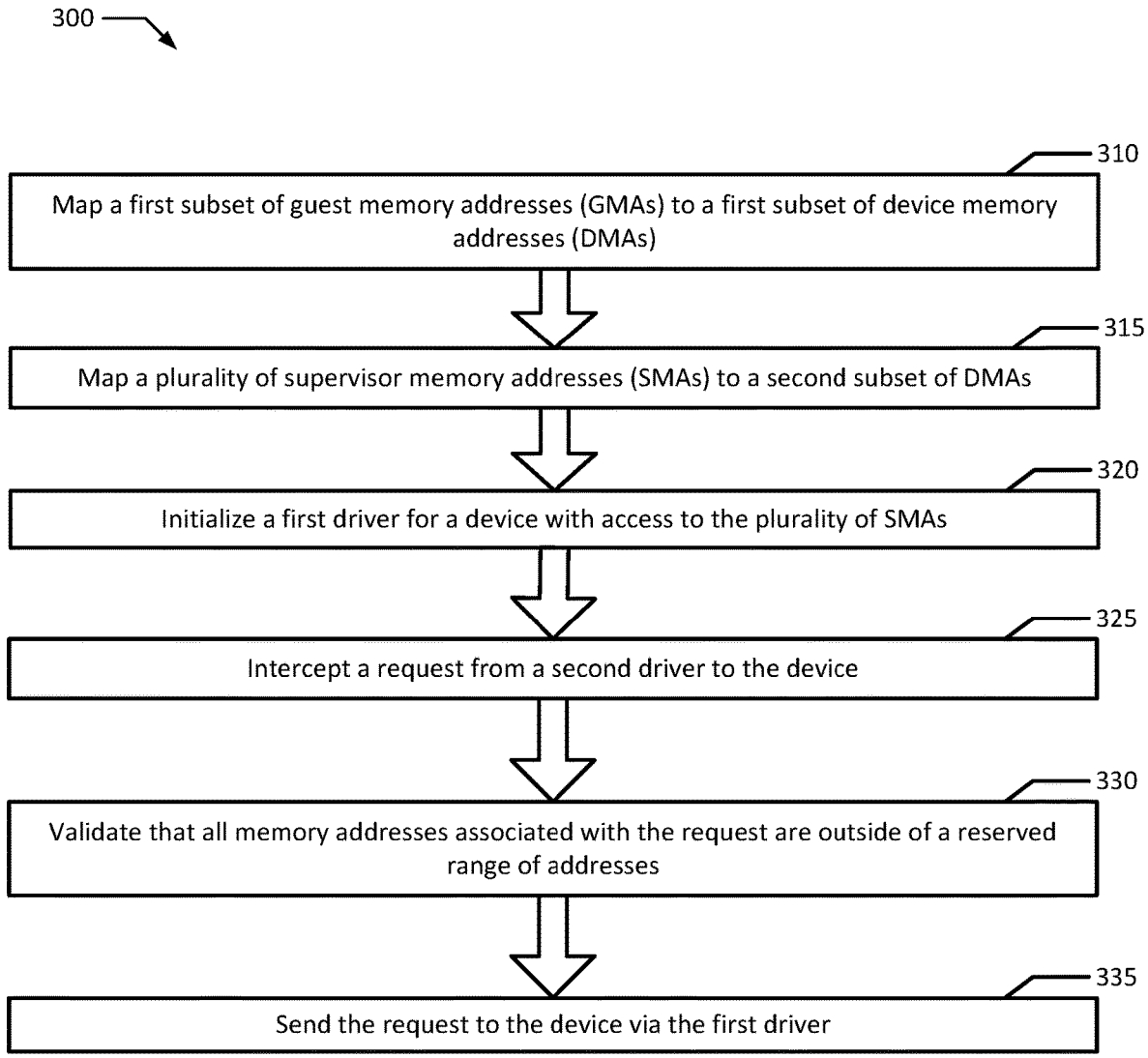
FIG. 3 illustrates a flowchart of an example process for safe physical device access according to an example embodiment of the present disclosure.

FIG. 3 illustrates a flowchart of an example method 300 for safe virtual machine physical device access in accordance with an example embodiment of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. The method 300 may be performed by processing logic that may comprise hardware (circuitry, dedicated logic, etc.), software, or a combination of both.

The example method 300 includes mapping a first subset of guest memory addresses (GMAs) to a first subset of device memory addresses (DMAs) (block 310). For example, a supervisor 120 may map a first subset of GMAs (e.g., GVA 221 or GPA 251) to a first subset of DMAs (e.g., IOVA 231). The device (e.g., I/O device 116) may be configured to communicate with the guest 122 via the first subset of DMAs (e.g., IOVA 231). The device (e.g., I/O device 116) may be configured to access the memory via an IOMMU. Additionally, the DMAs may be virtual memory addresses translated by an IOMMU page table. In other examples, the guest 122 may be configured to access contents of the first subset of GMAs via direct memory access. Similarly, the device (e.g., I/O device 116 or VI/O 194) may be configured to access contents of the first subset of DMAs via direct memory access.

Method 300 also includes mapping a plurality of supervisor memory addresses ("SMAs") to a second subset of DMAs (block 315). For example, a supervisor 120 may map a plurality of SMAs (e.g., HVA 263-264) to a second subset of DMAs (e.g., IOVA 235-236). The second subset of DMAs may be located in a reserved range of addresses (e.g., reserved address range 215). The device (e.g., I/O device 116 or VI/O 194) may be granted access to the reserved address range 215, which may be protected in an IOMMU page table 117 such that a virtual machine cannot modify the data within the reserved address range 215. In an example, the device (e.g., I/O device 116 or VI/O 194) may lack access to the plurality of SMAs prior to the plurality of SMAs being mapped to corresponding DMAs in an IOMMU page table 117. Conversely, the device (e.g., I/O device 116 or VI/O 194) may have access to the entire address space since it is controlled by the supervisor (e.g., hypervisor 120).

Then, method 300 includes initializing a first driver for a device with access to the plurality of SMAs (block 320). For example, the supervisor 20 may initialize a first driver (e.g., supervisor driver 125) for the device (e.g., I/O device 116) with access to the plurality of SMAs (e.g., HVA 263-264). The device (e.g., I/O device 116) may be configured to communicate with the supervisor 120 via the plurality of SMAs (e.g., HVA 263-264).

Method 300 also includes intercepting a request from a second driver to the device (block 325). For example, the supervisor 120 may intercept a request from a second driver (e.g., driver 155). The second driver (e.g., driver 155) may be initialized by a guest 122 for the device (e.g., I/O device 116 or VI/O 194). The device may be incompatible with the second driver (e.g., driver 155) and the first driver (e.g., supervisor driver 125) may convert the request into a format compatible with the device prior to sending the request to the device (e.g., I/O device 116 or VI/O 194). In an example, the request may include at least one address and length (e.g., virtual addresses "2800", "5600") and lengths (e.g., 4 kilobyte (kb), 1 kb) and the supervisor 120 may store the request in supervisor memory. The addresses may be physical memory addresses, virtual memory addresses, etc. Additionally, the addresses may be byte-addressable where the address identifies a single byte of storage, decimal digit-addressable where the address identifies a single six-bit binary-coded decimal digit, or the address may use other address and length conventions. Then, the method 300 includes validating that all memory addresses associated with the request are outside of a reserved range of addresses (block 330). For example, the supervisor 120 may validate that all memory addresses associated with the request are outside the reserved range of addresses (e.g., reserved address range 215). The reserved range of addresses may be protected against access by the guest 122 or modification by the guest 122.

The supervisor 120 may validate the request by verifying that the memory address and length do not overlap the reserved address range 215. In an example, the supervisor 120 may execute a memory access at a first address to validate the addresses and lengths included in the request. For example, the supervisor 120 may execute a memory access at an address included in the request and may read data stored at the first address to determine the length of the address. In another example, the supervisor 120 may verify that the address in the request does not trigger a fault.

If the request overlaps the reserved address range 215, the supervisor may reject the request. In an example, a request may be associated with memory addresses both inside and outside of the reserved address range 215 and the request may be entirely or partially rejected. For example, the supervisor may reject the portion of the request associated with addresses that overlap or are within the reserved address range 215. Additionally, an alert or an error may be generated in response to a rejected request.

Then, method 300 includes sending the request to the device via the first driver (block 335). For example, after validating the request, the supervisor 120 may send the request to the device (e.g., I/O device 116 or VI/O 194) via the first driver (e.g., supervisor driver 125), thereby advantageously preventing the virtual machine or associated applications from accessing the restricted memory range.

In other examples, the second driver (e.g., driver 155) may be configured to assign a second subset of GMAs as either a transmission buffer or a reception buffer for shared access with the device. The second driver (e.g., driver 155) may also assign a network address to the guest 122 while the first driver (e.g., driver 125) translates the network address into a different network address compatible with the device (e.g., I/O device 116 or VI/O 194) and a network connected to the device.

Figure 4:
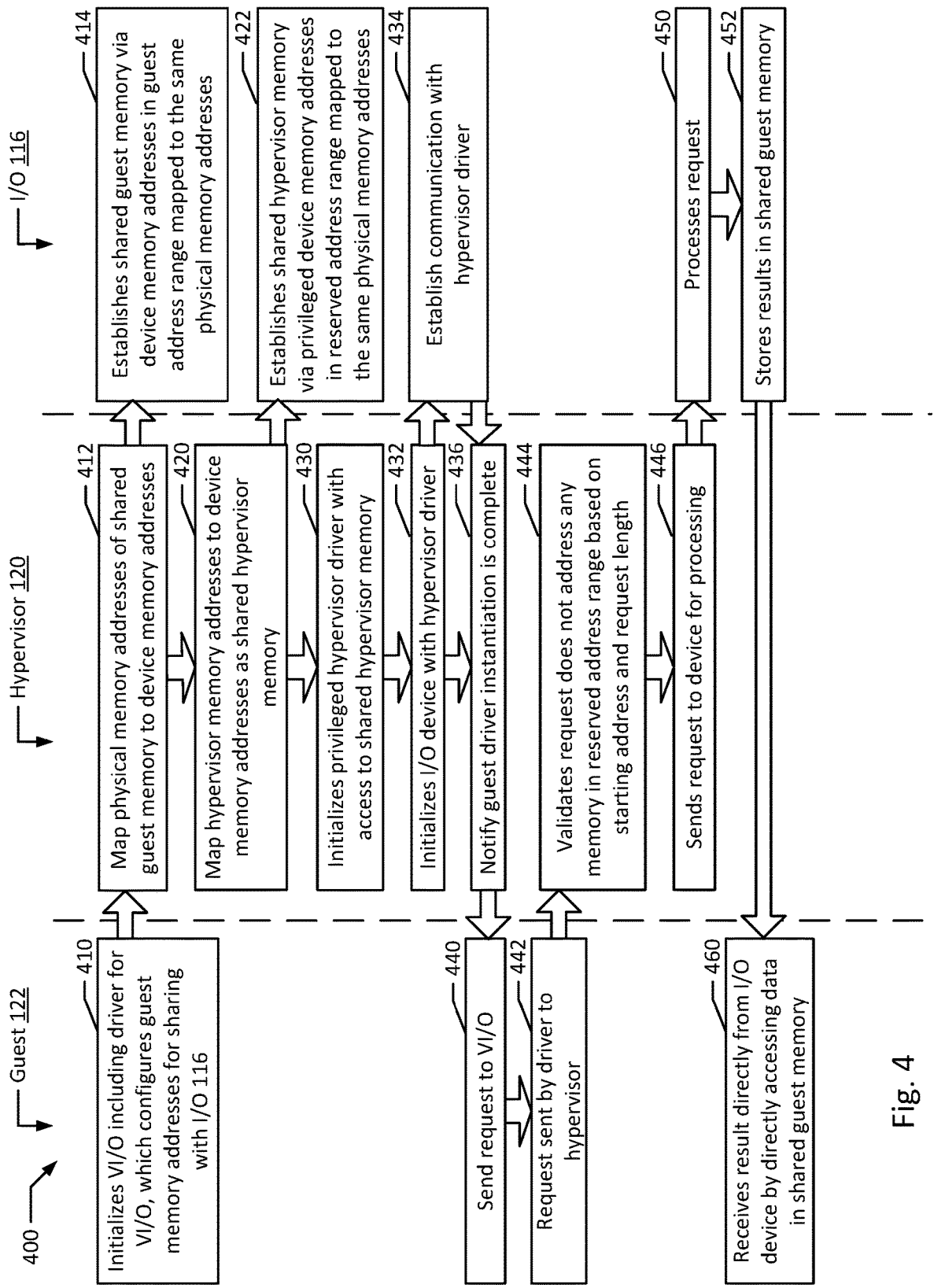
FIG. 4 illustrates a flow diagram of an example process for safe physical device access for network function virtualization by mapping hypervisor memory to a reserved range of addresses according to an example embodiment of the present disclosure.

FIG. 4 illustrates a flowchart of an example method 400 for safe virtual machine physical device access for network function virtualization by mapping supervisor memory to a reserved range of application virtual addresses in accordance with an example embodiment of the present disclosure. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, and some of the blocks described are optional. The method 400 may be performed by processing logic that may comprise hardware (circuitry, dedicated logic, etc.), software, or a combination of both. For example, guest 122, supervisor or hypervisor 120, and I/O device 116 may communicate to perform example method 400.

In the illustrated example, the guest 122 initializes a virtual I/O device (e.g., VI/O 194) including driver 155 for the VI/O 194, which configures guest memory addresses for sharing with I/O device 116 (block 410). Instead of an I/O device 116, guest memory may be configured for sharing with other devices such as a NIC or storage device. Then, the hypervisor 120 maps physical memory addresses of shared guest memory to device memory addresses (block 412). For example, the I/O device 116 may be given access, such as read/write access to supervisor memory. The hypervisor 120 may achieve the mapping by programming an IOMMU 115.

The I/O device 116 establishes shared guest memory via device memory addresses in guest address range mapped to the same physical memory addresses (block 414). For example, the I/O device 116 may have access to the PMAs similar to virtual machine pass-through implementations. The hypervisor 120 also maps hypervisor memory addresses to device memory addresses as shared hypervisor memory (block 420). For example, the hypervisor 120 may accomplish mapping hypervisor memory addresses to device memory addresses with the IOMMU 115. The I/O device 116 establishes shared hypervisor memory via privileged device memory addresses in a reserved address range mapped to the same physical memory addresses (block 422). The reserved address range may be read restricted or write restricted by the guest 122, thereby enhancing security and advantageously preventing userspace failures and device breaks caused by malicious memory modification.

Then, the hypervisor 120 initializes a privileged hypervisor driver (e.g., driver 125) with access to shared hypervisor memory (block 430). The hypervisor also initializes I/O device with the hypervisor driver (e.g., driver 125) (block 432). The hypervisor driver (e.g., driver 125) may enable the I/O device 116 to communicate with the shared hypervisor memory. After initialization, the I/O device 116 establishes communication with the hypervisor driver (e.g., driver 125) (block 434). For example, the hypervisor driver (e.g., driver 125) has access to the shared hypervisor memory and the I/O device 116 may be configured to communication with the hypervisor via the hypervisor memory. The hypervisor 120 or the hypervisor driver (e.g., driver 125) may notify the guest driver (e.g., driver 155) that instantiation is complete (block 436). For example, the hypervisor 120 may notify the guest driver (e.g., driver 155) that the hypervisor driver 125 is initialized along with the I/O device 116.

Then, the guest 122 may send a request to the VI/O device 194 (block 440). The guest 122 may generate a request that includes one or more addresses and lengths (e.g., 4 kilobyte (kb), 1 kb). Specifically, the request may be sent by driver 155 to the hypervisor 120 (block 442). In an example, the request may involve modifying data or page table entries associated with the I/O device 116. The hypervisor 120 validates that the request does not address any memory in the reserved address ranged 215 based on the request's starting address and request length (block 444). If the hypervisor 120 was unable to validate the request, the hypervisor 120 may receive a fault because the guest 122 is not allowed direct access to the reserved address range 215. For requests that cannot be validated, the hypervisor 120 may block the requests. Specifically, the hypervisor 120 may block any requests with addresses or lengths that overlap anything in the reserved range to increase security and prevent failure or breakage of the I/O device 116. For example, the request may include an address and length of 4 kb that overlaps the reserved address range 215 by 2 kb and the hypervisor 120 may block the request due to the overlap. In an example, if the hypervisor 120 receives a fault, the hypervisor 120 may issue an interrupt to block the request. By verifying the requests do not overlap the restricted range of memory, security is improved as the guest 122 is not allowed access to the protected memory of the I/O device 116. Thus, only legal attempts to access the I/O device 116 are approved.

After validating the request, the hypervisor 120 sends the request to the device 116 for processing (block 446). For example, if the virtual addresses and lengths in the request do not overlap the reserved address range 215, the hypervisor 120 may submit the request to the I/O device 116. Then, the I/O device 116 processes the request (block 450) and stores the result in shared guest memory (block 452). For example, the I/O device 116 may perform the task requested by guest 122 without risking the guest 122 altering the reserved address range 215. Then, the guest 122 receives the result directly from the I/O device 116 by directly accessing data in shared guest memory 197A (block 460).

Figure 5:
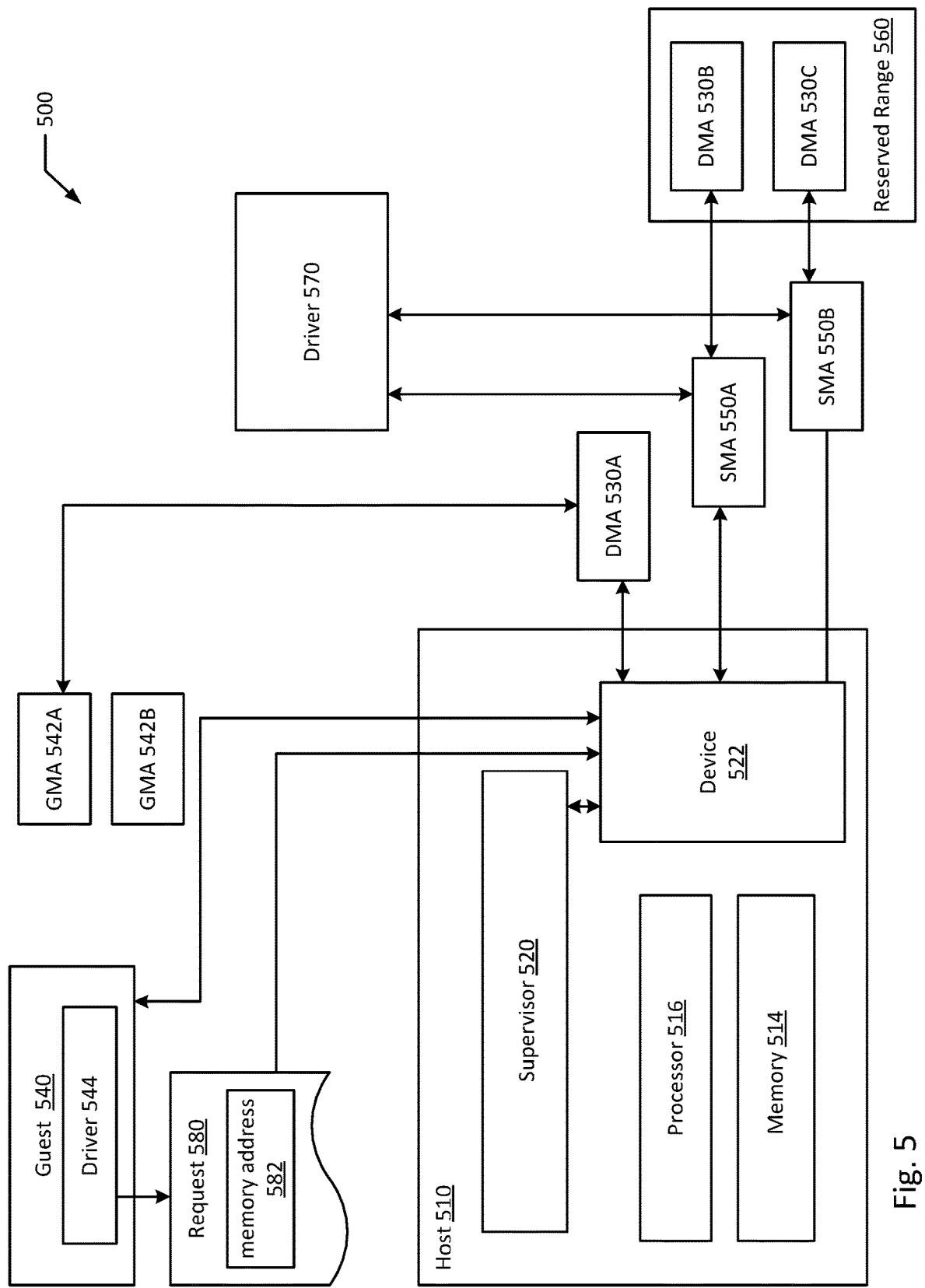
FIG. 5 illustrates a block diagram of an example safe virtual machine physical device access system according to an example embodiment of the present disclosure.

FIG. 5 is a block diagram of an example safe virtual machine physical device access system 500 according to an example embodiment of the present disclosure. The safe virtual machine physical device access system 500 may include a host 510 with a memory 514, a processor 516, a supervisor 520, and a device 522 with access to a plurality of device memory addresses (e.g., DMAs 530A-C). The system 500 also includes a guest 540 with access to a plurality of guest memory addresses (e.g., GMAs 542A-B). The guest 540 is configured to execute on the processor 516 to initialize a first driver 544 for the device 522. The supervisor 520 is configured to execute on the processor 516 to map a first subset of GMAs (e.g., GMA 542A) to a first subset of DMAs (e.g., DMA 530A). The device 522 is configured to communicate with the guest 540 via the first subset of DMAs (e.g., DMA 530A). Additionally, the supervisor 520 is configured to map a plurality of supervisor memory addresses (e.g., SMAs 550A-B) to a second subset of DMAs (e.g., DMAs 530B-C). The second subset of DMAs (e.g., DMAs 530B-C) is located in a reserved range 560 of addresses. The supervisor 520 is also configured to initialize a second driver 570 for the device 522 with access to the plurality of SMAs (e.g., SMAs 550A-B). The device 570 is configured to communicate with the supervisor 520 via the plurality of SMAs 550A-B. The supervisor 520 is also configured to intercept a request 580 from the first driver 544 to the device 522 and validate that all memory addresses 582 associated with the request 580 are outside of the reserved range 560 of addresses. After validating the request 580, the supervisor 520 is configured to send the request 580 to the device 522 via the second driver 570.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as application specific integrated circuits ("ASICs"), field programmable gate arrays ("FPGAs"), digital signal processors ("DSPs") or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
   a non-transitory computer-readable storage medium of a host; and
   a processor of a supervisor of the host coupled to the non-transitory computer-readable storage medium and configured to:
      map, during initialization of a first driver for a physical device of the host, a first subset of a plurality of guest memory addresses (GMAs) accessible by a guest to a first subset of a plurality of device memory addresses (DMAs) accessible by the physical device, wherein the physical device is configured to communicate with the guest via the first subset of DMAs;
      map a plurality of supervisor memory addresses (SMAs) to a second subset of DMAs, wherein the second subset of DMAs is located in a reserved range of addresses of the physical device, wherein the reserved range of addresses is protected against modification by the guest and stores device information of the physical device, wherein the physical device lacks access to the plurality of SMAs prior to being granted access to the plurality of SMAs by the supervisor;
      initialize a second driver for the physical device with access to the plurality of SMAs, wherein the physical device is configured to communicate with the supervisor via the plurality of SMAs, wherein a second subset of GMAs is assigned as one of a transmission buffer and a reception buffer for shared access with the physical device;
      intercept a request from the first driver to the physical device, wherein the request includes at least one memory address and length;
      validate that each of the at least one memory address and length in the request is outside of the reserved range of addresses of the physical device, such that each memory address and length included in the request are not overlapping with the reserved range of addresses of the physical device to protect the physical device; and
      after validating that each of the at least one memory address associated with the request is outside of the reserved range of addresses of the physical device, send the request to the physical device via the second driver.

2. The system of claim 1, wherein the physical device is configured to access the memory via an input/output memory management unit (IOMMU), and the plurality of DMAs are virtual memory addresses translated by an IOMMU page table.

3. The system of claim 1, wherein the physical device is granted access to the plurality of SMAs when the supervisor maps the plurality of SMAs to corresponding DMAs in an IOMMU page table.

4. The system of claim 1, wherein the physical device is incompatible with the first driver, and the second driver converts the request into a format compatible with the physical device prior to sending the request to the physical device.

5. The system of claim 1, wherein the supervisor is a hypervisor, and the hypervisor is configured to reject a second request from the first driver based on the second request being associated with a memory address and a length in the reserved range.

6. The system of claim 5, wherein the second request is associated with memory addresses both inside and outside of the reserved range, and wherein the hypervisor is configured to reject the second request entirely based on the second request being associated with memory addresses outside of the reserved range.

7. The system of claim 5, wherein the hypervisor is configured to:
   partially reject the second request for a portion of the request associated with memory addresses outside of the reserved range, and
   generate at least one of an alert and an error in response to the second request.

8. The system of claim 1, wherein at least one of (i) the guest is configured to access contents of the first subset of GMAs via direct memory access, and (ii) the physical device is configured to access contents of the first subset of DMAs via direct memory access.

9. The system of claim 1, wherein the reserved range of addresses of the physical device is protected against access by the guest.

10. The system of claim 1, wherein the first driver assigns a first network address to the guest, and the second driver translates the first network address into a second network address compatible with at least one of the physical device and a network connected to the physical device.

11. The system of claim 1, wherein the second driver is configured to initialize a connection between the first driver and the physical device.

12. The system of claim 1, wherein the physical device is one of a network interface and a storage device.

13. The system of claim 1, wherein the supervisor is one of a hypervisor and a host operating system.

14. A method comprising:
   mapping, by a supervisor, a first subset of guest memory addresses (GMAs) to a first subset of device memory addresses (DMAs), wherein a physical device is configured to communicate with a guest via the first subset of DMAs;
   mapping, by the supervisor, a plurality of supervisor memory addresses (SMAs) to a second subset of DMAs, wherein the second subset of DMAs is located in a reserved range of addresses of the physical device, wherein the reserved range of addresses is protected against modification by the guest and stores device information of the physical device, wherein the physical device lacks access to the plurality of SMAs prior to being granted access to the plurality of SMAs by the supervisor;
   initializing, by the supervisor, a first driver for the physical device with access to the plurality of SMAs, wherein the physical device is initialized with a second driver, and the physical device is configured to communicate with the supervisor via the plurality of SMAs, wherein a second subset of GMAs is assigned as one of a transmission buffer and a reception buffer for shared access with the physical device;

intercepting, by the supervisor, a request from the second driver to the physical device, wherein the request includes at least one memory address and length;

validating, by the supervisor, that each of the at least one memory address and length in the request is outside of the reserved range of addresses of the physical device, such that each memory address and length included in the request are not overlapping with the reserved range of addresses of the physical device to protect the physical device; and after validating that each of the at least one memory address associated with the request is outside of the reserved range of addresses of the physical device, sending, by the supervisor, the request to the physical device via the second driver.

15. The method of claim 14, wherein the physical device is configured to access the memory via an input/output memory management unit (IOMMU), and the plurality of DMAs are virtual memory addresses translated by an IOMMU page table.

16. The method of claim 14, further comprising mapping, by the supervisor, the plurality of SMAs to corresponding DMAs, wherein the physical device lacks access to the plurality of SMAs prior to the plurality of SMAs being mapped to corresponding DMAs in an IOMMU page table.

17. The method of claim 14, wherein the physical device is incompatible with the second driver, and the first driver converts the request into a format compatible with the physical device prior to sending the request to the physical device.

18. The method of claim 14, further comprising intercepting a second request from the second driver to the physical device, wherein the second request is associated with memory addresses both inside and outside of the reserved range.

19. A non-transitory machine-readable medium storing code, which when executed by a processor, is configured to cause a supervisor to:

map a first subset of guest memory addresses (GMAs) to a first subset of device memory addresses (DMAs), wherein a physical device is configured to communicate with a guest via the first subset of DMAs;

map a plurality of supervisor memory addresses (SMAs) to a second subset of DMAs, wherein the second subset of DMAs is located in a reserved range of addresses of the physical device, wherein the reserved range of addresses is protected against modification by the guest and stores device information of the physical device, wherein the physical device lacks access to the plurality of SMAs prior to being granted access to the plurality of SMAs by the supervisor;

initialize a first driver for the physical device with access to the plurality of SMAs, wherein the physical device is initialized with a second driver, the physical device is configured to communicate with the supervisor via the plurality of SMAs, and a second subset of GMAs is assigned as one of a transmission buffer and a reception buffer for shared access with the physical device;

intercept a request from the second driver to the physical device, wherein the request includes at least one memory address and length;

validate that each of the at least one memory address and length in the request is outside of the reserved range of addresses of the physical device, such that each memory address and length included in the request are not overlapping with the reserved range of addresses of the physical device to protect the physical device; and after validating that each of the at least one memory address associated with the request is outside the reserved range of addresses of the physical device, send the request to the physical device via the second driver.

* * * * *